United States Patent
Cleary et al.

(10) Patent No.: US 7,412,703 B2
(45) Date of Patent: Aug. 12, 2008

(54) LOW COST, HIGHLY ACCURATE VIDEO SERVER BIT-RATE COMPENSATION

(75) Inventors: Geoffrey Alan Cleary, Ambler, PA (US); Joseph I. Brown, Lansdale, PA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 810 days.

(21) Appl. No.: 10/665,738

(22) Filed: Sep. 19, 2003

(65) Prior Publication Data

US 2004/0148390 A1 Jul. 29, 2004

Related U.S. Application Data

(60) Provisional application No. 60/412,038, filed on Sep. 19, 2002, provisional application No. 60/413,197, filed on Sep. 24, 2002.

(51) Int. Cl.
*G06F 9/46* (2006.01)
*G06F 15/16* (2006.01)
*H04N 7/173* (2006.01)

(52) U.S. Cl. ............... 718/102; 718/100; 718/103; 718/105; 709/201; 709/231; 725/87; 725/93

(58) Field of Classification Search ............ 718/1–108; 348/721; 725/74, 87, 93; 709/201, 203, 709/230–233
See application file for complete search history.

(56) References Cited

U.S. PATENT DOCUMENTS

| | | | | |
|---|---|---|---|---|
| 5,675,798 | A * | 10/1997 | Chang | 709/224 |
| 5,778,179 | A * | 7/1998 | Kanai et al. | 709/203 |
| 5,799,150 | A * | 8/1998 | Hamilton et al. | 709/203 |
| 5,987,501 | A * | 11/1999 | Hamilton et al. | 709/203 |
| 6,058,414 | A * | 5/2000 | Manikundalam et al. | 718/104 |
| 6,212,571 | B1 * | 4/2001 | Kikuchi et al. | 709/248 |
| 6,223,211 | B1 * | 4/2001 | Hamilton et al. | 709/203 |
| 6,711,622 | B1 * | 3/2004 | Fuller et al. | 709/231 |
| 6,839,764 | B2 * | 1/2005 | Unice | 709/230 |
| 7,036,123 | B2 * | 4/2006 | Dorofeev et al. | 718/102 |
| 7,222,178 | B2 * | 5/2007 | Loboz et al. | 709/226 |
| 7,227,589 | B1 * | 6/2007 | Yeo et al. | 348/721 |
| 2002/0083468 | A1 * | 6/2002 | Dudkiewicz | 725/133 |
| 2002/0093468 | A1 * | 7/2002 | Ouchi et al. | 345/55 |
| 2006/0233266 | A1 * | 10/2006 | Suetsugu | 375/259 |

OTHER PUBLICATIONS

"MultiProcessor Specification," version 1.4, published by Intel, May 1997.
Network Time Protocol (Version 3) Specification, Implementation, RFC 1305, Mar. 1992.

* cited by examiner

*Primary Examiner*—Meng-Ai An
*Assistant Examiner*—Abdullah Al Kawsar
(74) *Attorney, Agent, or Firm*—Patterson & Sheridan, LLP

(57) ABSTRACT

A method, apparatus and system for adaptably distributing video server processes among processing elements within a video server such that video server operation may be adapted in a manner facilitating rigorous timing constraints.

11 Claims, 14 Drawing Sheets

LOW COST, HIGHLY ACCURATE VIDEO SERVER BIT-RATE COMPENSATION

CROSS-REFERENCE TO RELATED APPLICATIONS

This application claims benefit of United States provisional patent applications Ser. No. 60/412,038 and 60/413,197, filed respectively on Sep. 19, 2002 and Sep. 24, 2002, which are herein incorporated by reference in their entireties.

BACKGROUND OF THE INVENTION

A key feature of a video server is its ability to generate streams of video at a precise bit rate. This is critical for compliance with the Motion Picture Experts Group (MPEG) standard. A secondary goal for a video server is of-course, a low cost of its components. There is a conflict between these two goals, since cheaper components tend to have higher drift. This is particularly true of components such as crystals. Earlier video servers that do not utilize this invention required expensive, highly stable crystal oscillators to be included in their design.

Commonly available General Purpose Operating System software does not provide deterministic response times to events (such as the availability of data from a disk, or the need to output data at a given time). To solve these problems, two solutions are typically employed either together or singly. First, operating system software with deterministic behavior is utilized. This software has a premium cost associated with them in the form of runtime royalties and development seat costs. Second, custom hardware is designed to tackle the timing problems and the Operating system read/writes data to/from the hardware via a buffering system, separating the Operating system from the time critical constraints. Such hardware development and fabrication have costs and risks associated with them.

SUMMARY OF THE INVENTION

Various problems of the prior art are addressed by the present invention of a method, apparatus and system for adaptably distributing video server processes among processing elements within a video server such that video server operation may be adapted in a manner facilitating rigorous timing constraints.

Specifically, a method according to one embodiment of the invention comprises associating each of a plurality of processing elements with at least one respective video server process; assigning priority to said processing elements according to a hierarchy of video server processes, each of said video server processes having a relative priority level with respect to other video server processes; adjusting the hierarchy of video server processes according to at least one of monitored timing parameters, changes in system loading conditions, changes in operating conditions and operating system scheduler requirements.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 12 depicts a method according to an embodiment of the present invention;

DETAILED DESCRIPTION OF THE PREFERRED EMBODIMENT

One feature of the invention is that by careful partitioning of the processes which constitute a video server system onto the individual processors of a Symmetric Multi-Processing (SMP) system, the need for specialized hardware or Operating System Software (OS) is mitigated.

Initial tests, utilizing a modified Linux Operating System, have shown satisfactory results for the present invention, which will allow a substantial reduction in cost of a video server product line. One implementation uses multiprocessor version of Linux Operating System. It has been enhanced to allow control over which processes run on which processors. Another implementation is used if the first implementation proves to provide insufficient performance.

Figure 1:
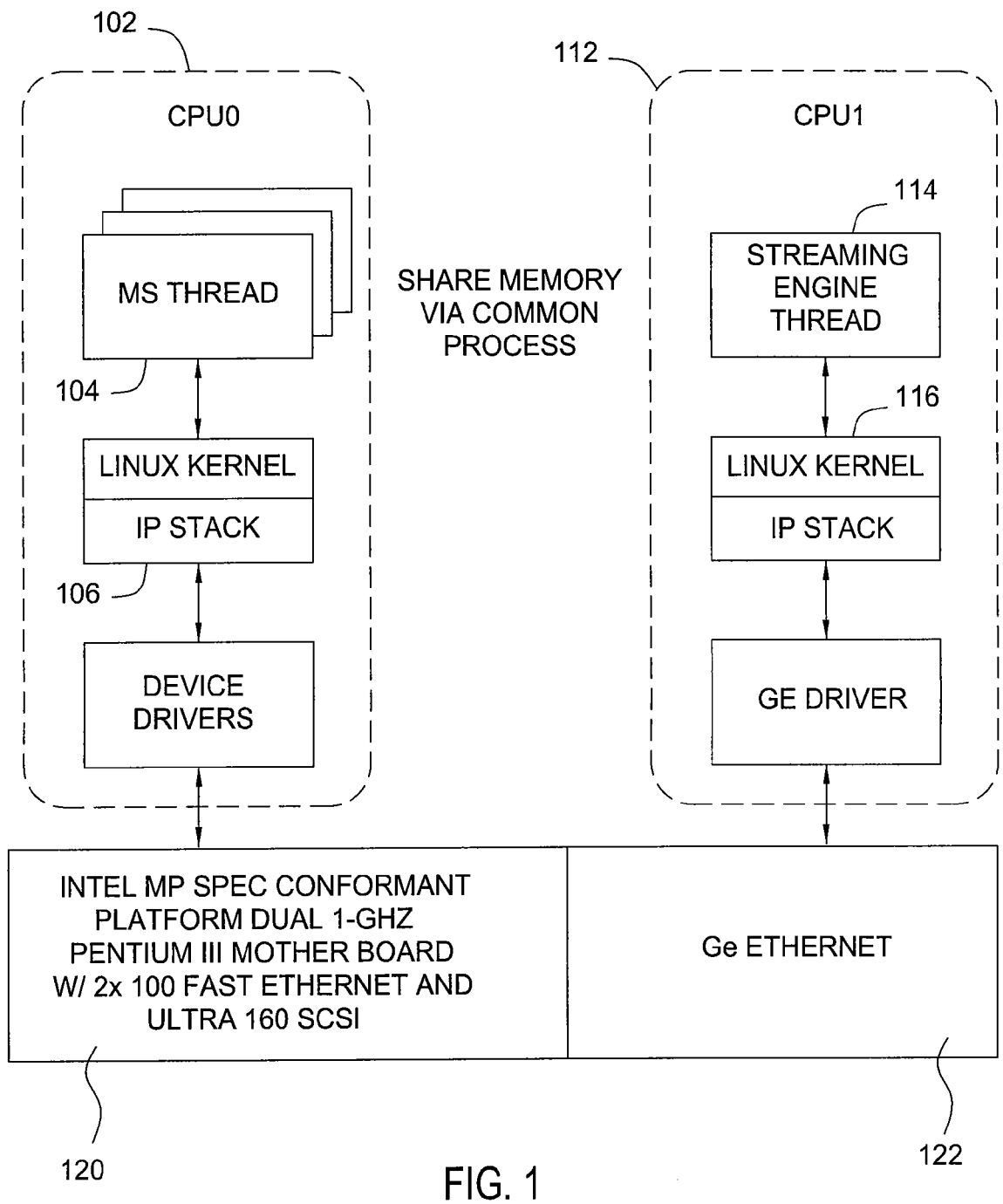
FIGS. 1 and 2 depict, respectively, structure architectures for multi-processor and uni-processor implementations according to the present invention.

FIG. 1 shows the software architecture for a Linux implementation of the present invention (other operating systems may be used). The figure shows the foundation hardware to be Intel MultiProcessor Specification compliant hardware 120, running an SMP Linux Operating System. The kernels 106 and 116 are modified to allow Central Processing Unit (CPU) binding (processes can be locked onto specific processors). The first processor 102 runs the administrative processes 104 and the video data retrieval process. The second processor 112 runs software 114 that drives the video data out at a critically controlled rate. Since the data streaming has the highest real time demands, interruptions of this process can be minimized by assigning all interrupts (other than Gigabit Ethernet 122) to the other processor 102.

Figure 2:
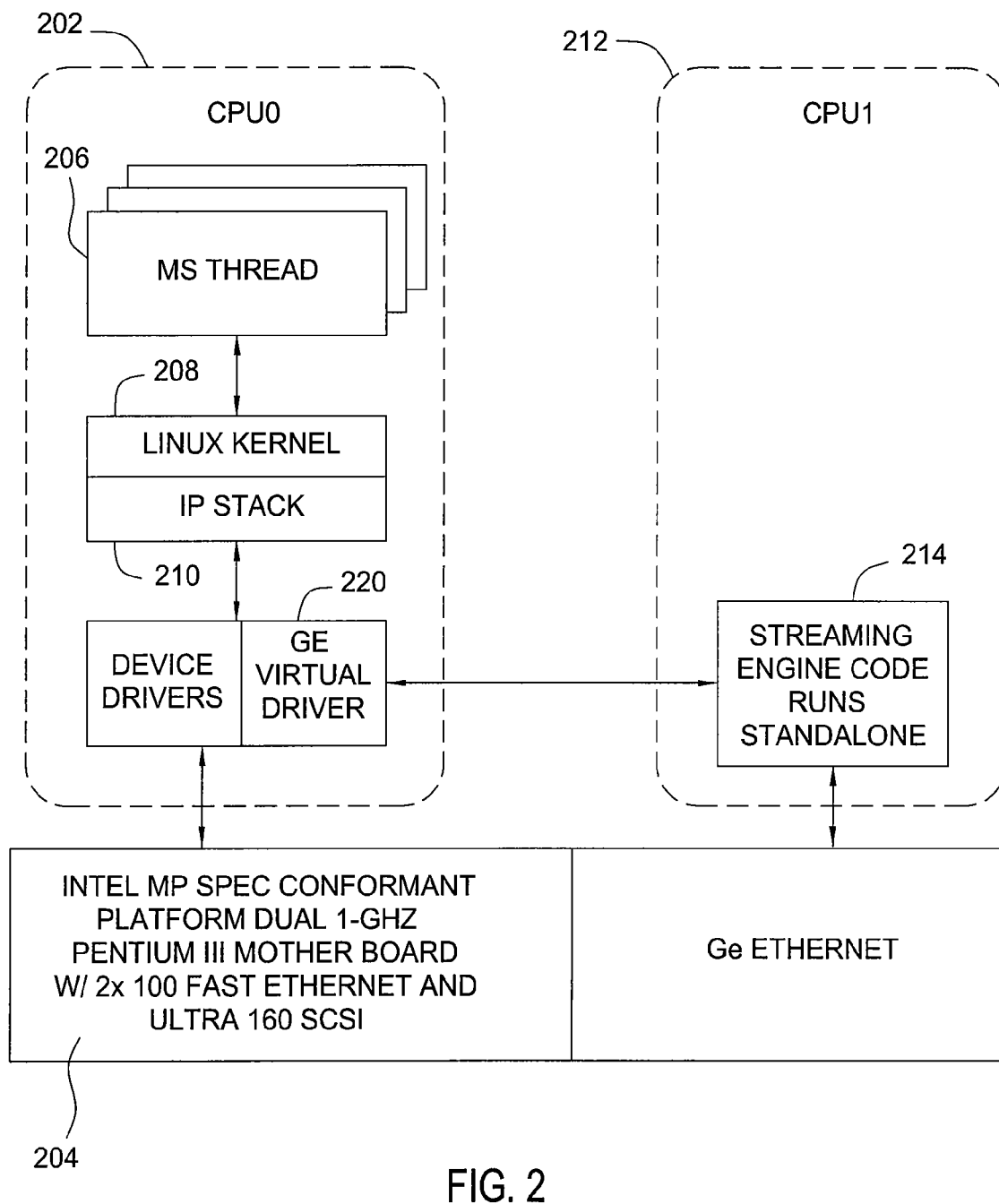

FIG. 2 shows the software architecture for the uni-processor Linux implementation. Again the foundation hardware is Intel Multi-Processor Specification compliant hardware 204. The video server tasks are divided up the same way; the first processor 202 runs the administrative processes 206 and the video data retrieval process and the second processor 212 runs software 214 that drives the video data out at a critically controlled rate. The difference being that the second processor 212 is not running Linux 208 and consequently the application 214 will not be interrupted by the operating system 208. This allows the dedicated streaming engine software 214 to have fine control over the CPU1 cache hardware 212 and to allow the Stream Engine 214 to achieve maximum performance by executing its code entirely from within the processors L1+2 cache.

Since the Streaming Engine 214 is running without an OS support, the IP stack 210 of the Kernel 208 will no longer take care of network housekeeping (Internet Control Message Protocol, or "ICMP"). To facilitate this, it is proposed that a 'Gigabit Ethernet virtual driver' 220 be implemented under the Linux kernel 212 on CPU0 202. This would pass any non-streaming packets back and forth between the Streaming Engine code 214 running on CPU1 212 and the kernel 208 on CPU0 202. This allows ping and other ICMP messages to be supported without the need to implement them in the Streaming Engine code 214.

Intel has published a standard for MultiProcessor systems known as "MultiProcessor Specification" version 1.4 1997, which is incorporated herein by reference in its entirety and may be accessed at http://developer.intel.com/design/pro/datashts/2420 1606. pdf. This specification describes an architecture where memory and peripherals are symmetrically shared between multiple processors. Machines are readily available, which conform to this standard, in the form of multi-processor Personal Computers (PCs). The intention of the MultiProcessor Standard is for a single copy of the operating system and applications to run on all/any processors in the system. This architecture is known as Symmetric MultiProcessing.

When an application process runs on a MultiProcessor machine under a General Purpose Operating System, such as Linux, it will typically utilize the processor with the least load. The operating system has a component known as the scheduler, which periodically re-schedules tasks. It is critical that the operating system provide a mechanism to assign priorities to processes, however, even the highest priority process can be 'swapped' from one processor to another many times per second. Such swapping causes unacceptable inefficient utilization of the processors.

Video Servers are required to output data with strict conformance to industry standards. These standards require data packets to be output with deadlines expressed in microseconds. The demands of the output stage, in turn place requirements on the retrieval of data from the disk drives. Such requirements require the software to be Asymmetric, i.e. dedicated software runs on dedicated processors. By careful design and consideration of these needs, this patent describes how a commercial off-the-shelf (COTS) PC and COTS software can be utilized to create a platform that provides real time performance required for a Video on demand server.

The benefits of this invention are that dramatic savings can be made on the cost of the computer hardware and Operating System software. The trade off is that highly optimized and dedicated application software needs to be written.

This invention in one embodiment incorporates use of NTP; Network Time Protocol (STD0012, rfc1305 by David L. Mills, University of Delaware, March 1992). NTP provides the mechanisms to synchronize time and coordinate time distribution in a large, diverse internet operating at rates from mundane to lightwave. It uses a returnable-time design in which a distributed subnet of time servers operating in a self-organizing, hierarchical-master-slave configuration synchronizes local clocks within the subnet and to national time standards via wire or radio. The servers can also redistribute reference time via local routing algorithms and time daemons.

By use of this protocol in the design of a video server, relatively inexpensive hardware (e.g., off-the-shelf Personal Computer systems), can be used in the construction of high quality systems.

Terms and Abbreviations

| | |
|---|---|
| TSC | Time Stamp Counter |
| DSM | DIVA Services Manager: A components of the DIVA Video On Demand System. |
| NTP | Network Time Protocol: rtc2030 |

DVS6000 Embodiment

In one embodiment, techniques are provided that will be used to achieve satisfactory performance of the DVS6000 server in terms of its accuracy of output bit-rate. The techniques described in this document address the need to be able to measure and correctly compensate for, the actual frequency and drift of the main clock crystal on the system motherboard, which is not stable or well defined.

The highest resolution clock in a typical DVS6000 system is the processor clock. This runs at approximately 1 GHz. It is derived by multiplying up a 14.31818 MHz clock. This is the same crystal that is divided down to produce the 100 Hz system clock interrupt. The division is achieved by dividing the 14 MHz crystal by 12 to get 1.1931817 MHz, and dividing this by 11932. This corresponds to an error of about 200 ppm. To correct errors in the local system clock, the NTP software is proposed. NTP is already in place to keep the DSM time synchronized to a reference. Using an accurate system clock, the GHz clock can be measured and used as a basis for timing the transmission of MPEG packets The output bit-rate of the DVS6000 is held to within 6 ppm in order to meet the buffer requirements of the MPEG sink. The limiting factor is buffer overflow. Bit-rate of 15 is required for High Definition Television (HDTV), we are concerned, only with bit-rates up to 4 Mbps. For a 2-hour movie, we need a clock reference accurate to within 6.37 ppm. See Appendix A. This means that the typical output can range from 3.374988 to 3.750012 Mbps.

NTP Performance

Figure 3:
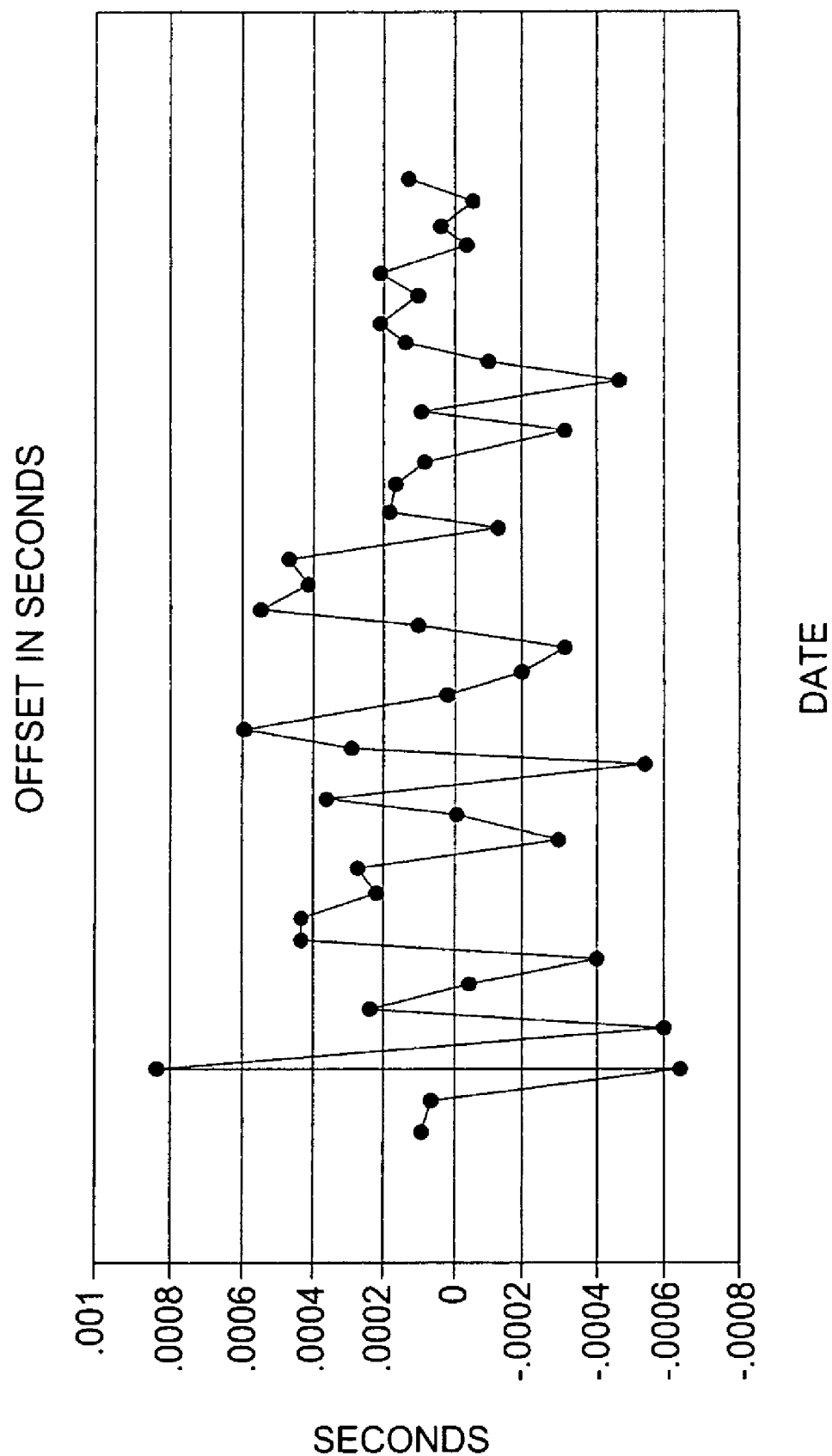
FIGS. 3-10 and 12 graphically depict timing, temperature drift and other parameters useful in understanding the present invention.
Figure 4:
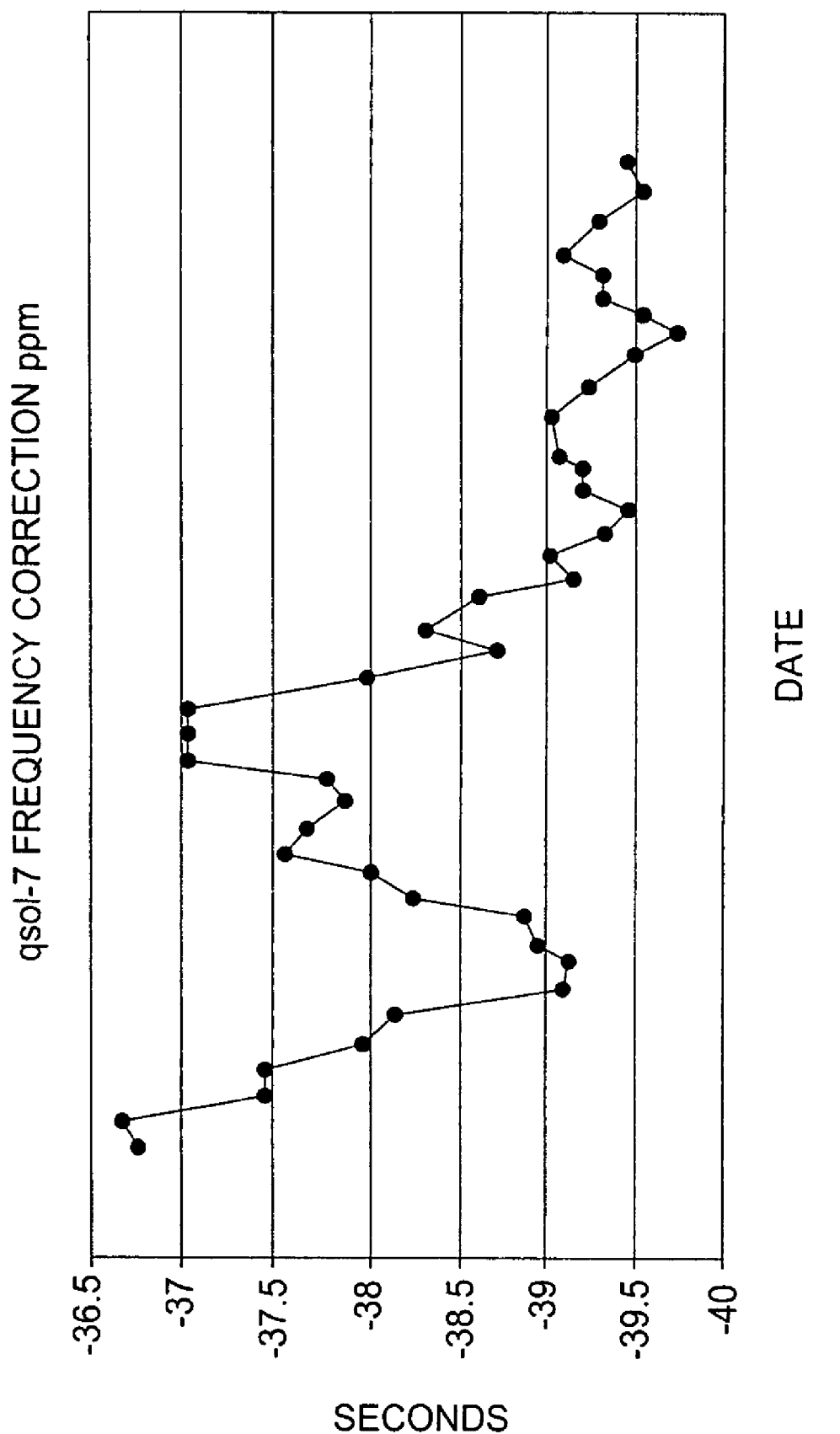
Figure 5:
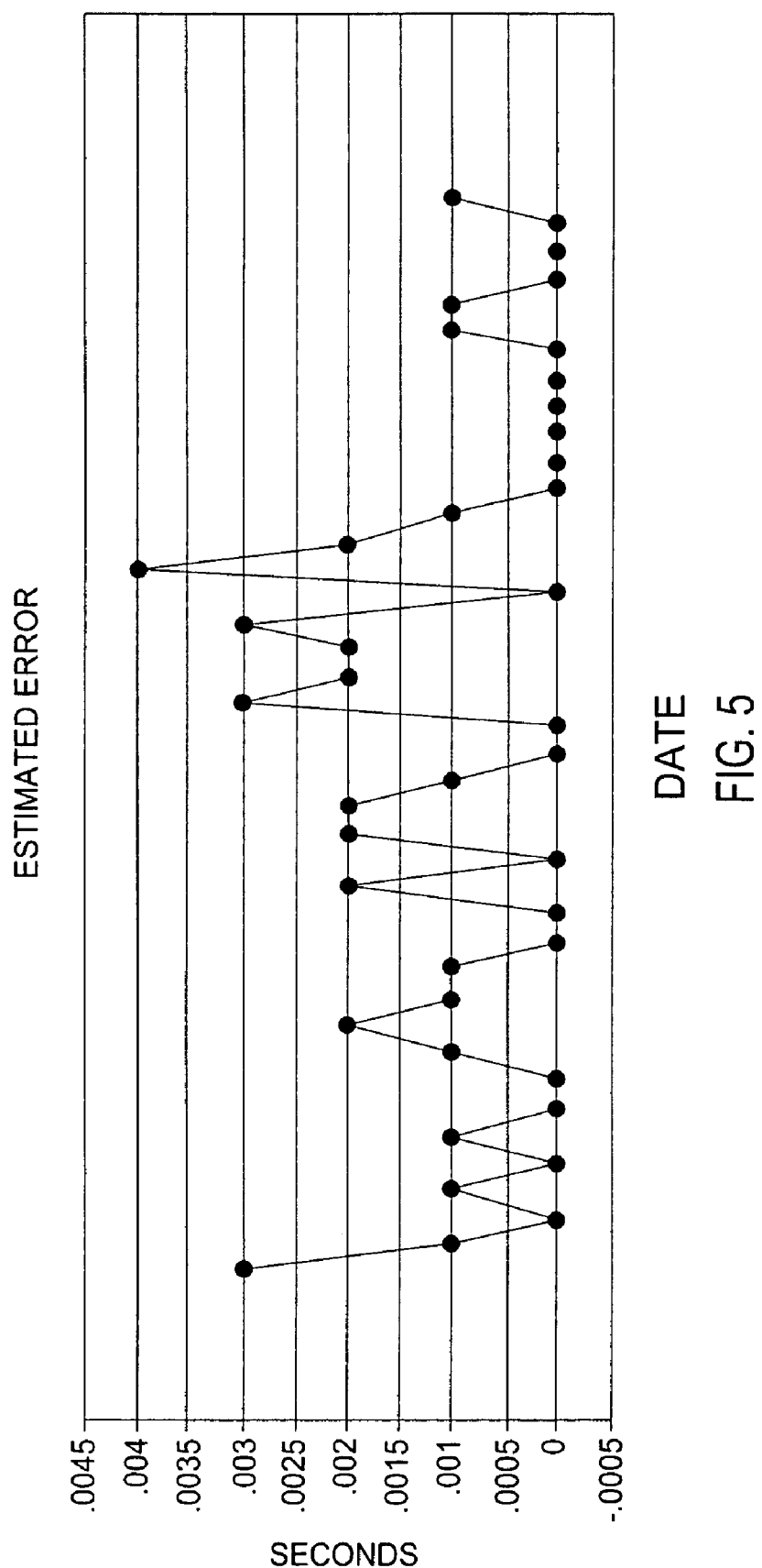

Rfc-2030 (NTP version 4) states "With careful design and control of the various latencies in the system, which is practical in a dedicated design, it is possible to deliver time accurate to the order of microseconds". In practice, offsets between server and client of within 5 ms are achieved. FIGS. 3, 4 and 5 show the offset (in seconds) between, respectively, the client and reference server, the frequency compensation being applied to the local clock in ppm, and the estimated error of the measurement of the reference time (in seconds).

These measurements were taken using a Qsol machine to confirm that the error will be within 5 ms. The time servers we were referencing have three switches and a router between them. The original reference is a Stratum 1 Internet source. It is imperative that the quality of the original time source be good and that the network between the servers be good. Since NTP uses round trip User Datagram Protocol (UDP) packets to acquire time samples, poor network communications increases the error in the time correction. It is assumed that DIVA will access to a stratum 1 or, optionally, stratum 2 timeserver with guaranteed sub millisecond to millisecond accuracy is provided.

The following results demonstrate the direct relationship between error reported by NTP and wander in the derived frequency of the GHz crystal.

Figure 6:
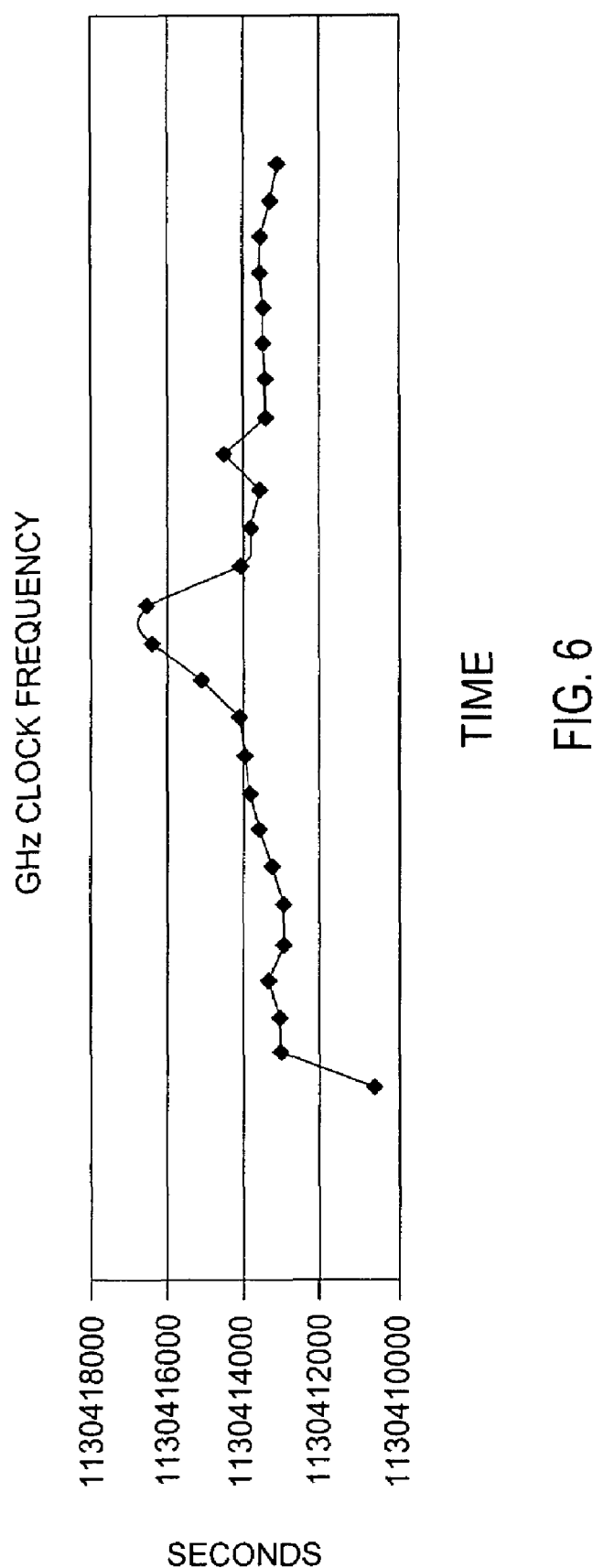
Figure 7:
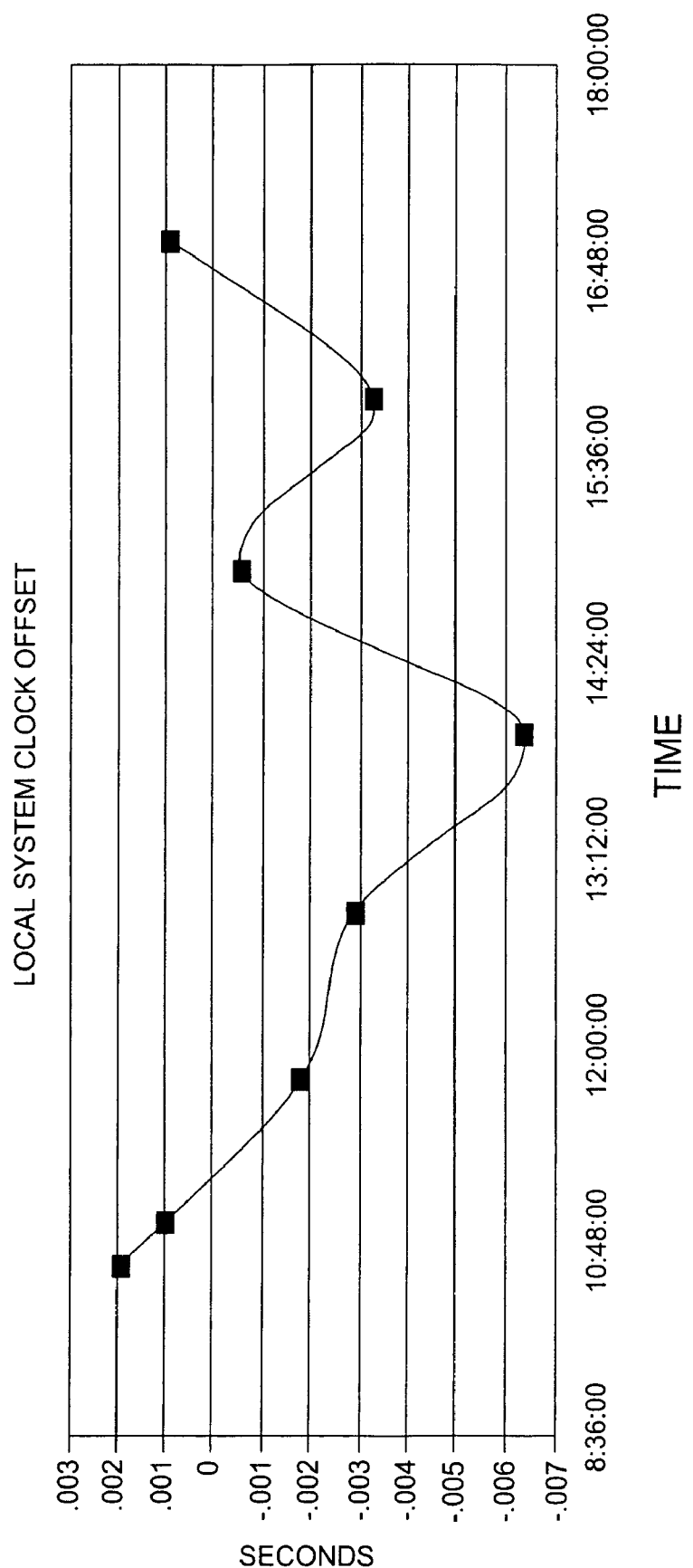

FIG. 6 shows the calculated clock frequency over a period of 6 hours. The measurements were taken every 1000 seconds. FIG. 7 shows the error reported by NTPd over the same period. The correlation is clear. This implies that the drift of the crystal is insignificant relative to the error from the timeserver used during this test.

Figure 8:
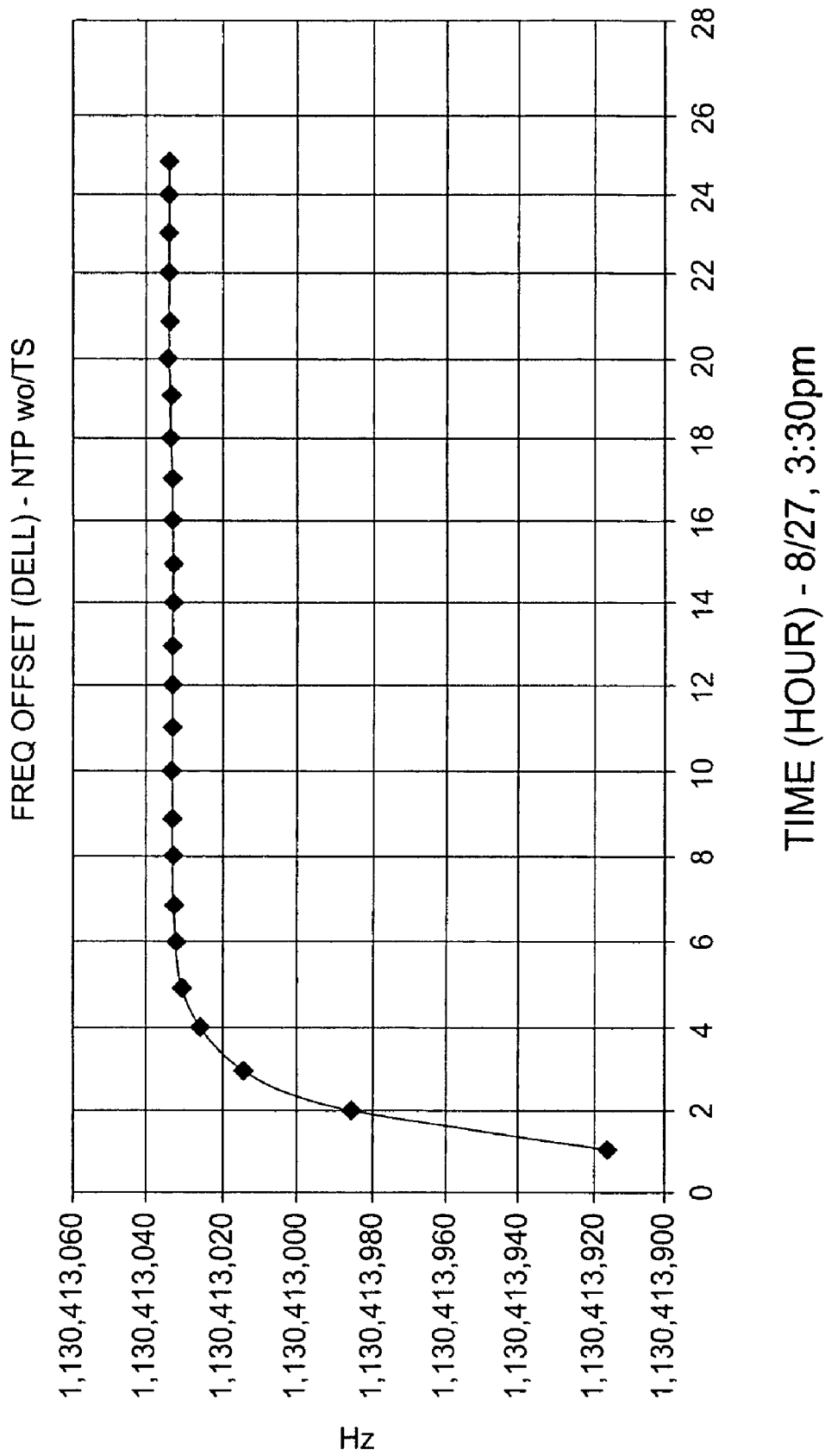

Should NTP be incapable of acquiring time readings from its timeservers, NTP will continue to correct the local time using the last calculated drift. The DVS6000 system should report the failure of a timeserver to respond if this should continue for more than 8 hours. See FIG. 8 that shows the behavior of NTP after the server connection is removed, over a 24-hour period.

Local Clock Stability

Figure 9:
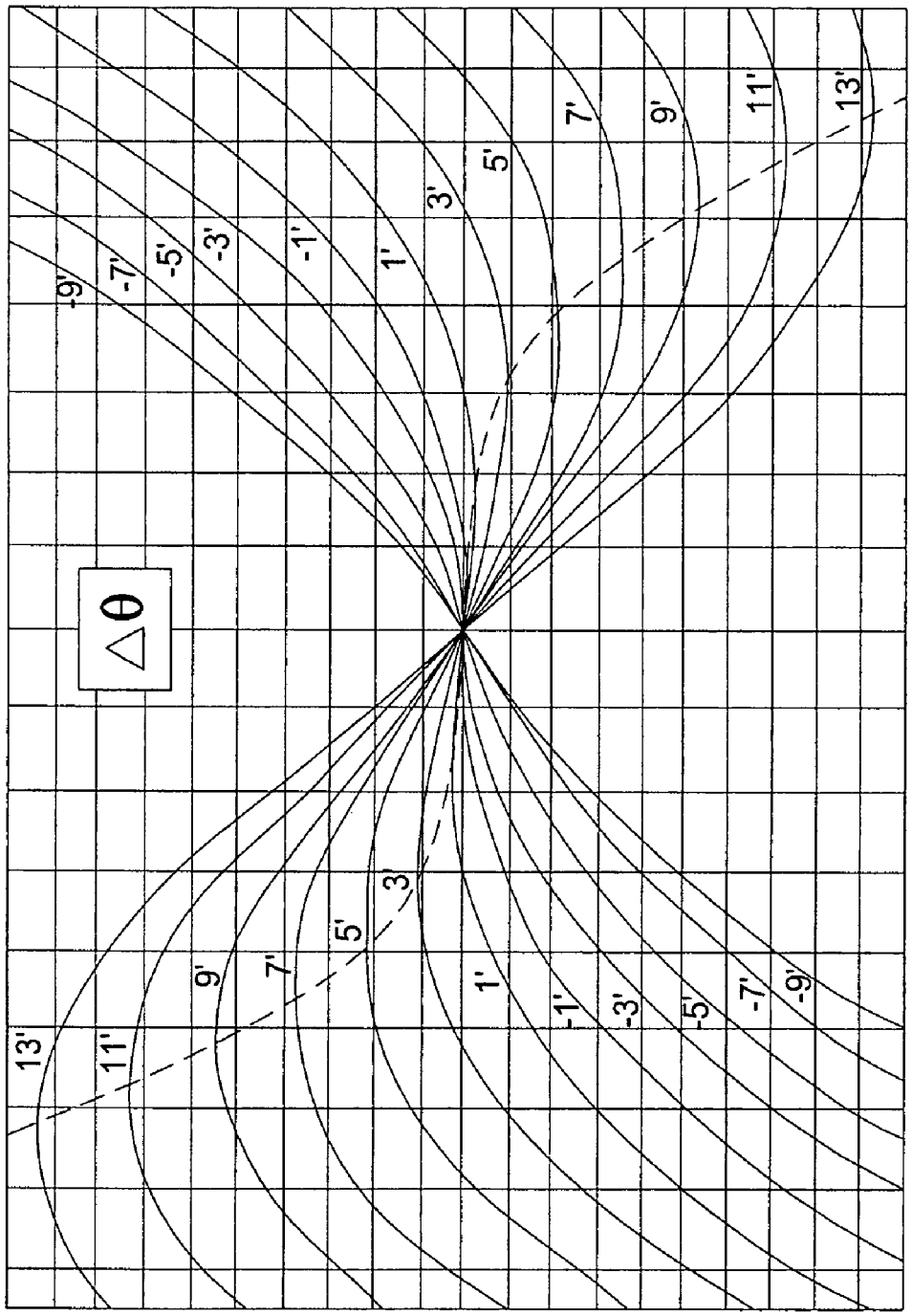

The stability of the local clock is based on the characteristics of the 14 MHz crystal. See FIG. 9 for its drift with temperature. Each line corresponds to a particular angle of cut of the crystal. Worst case is assumed.

Figure 10:
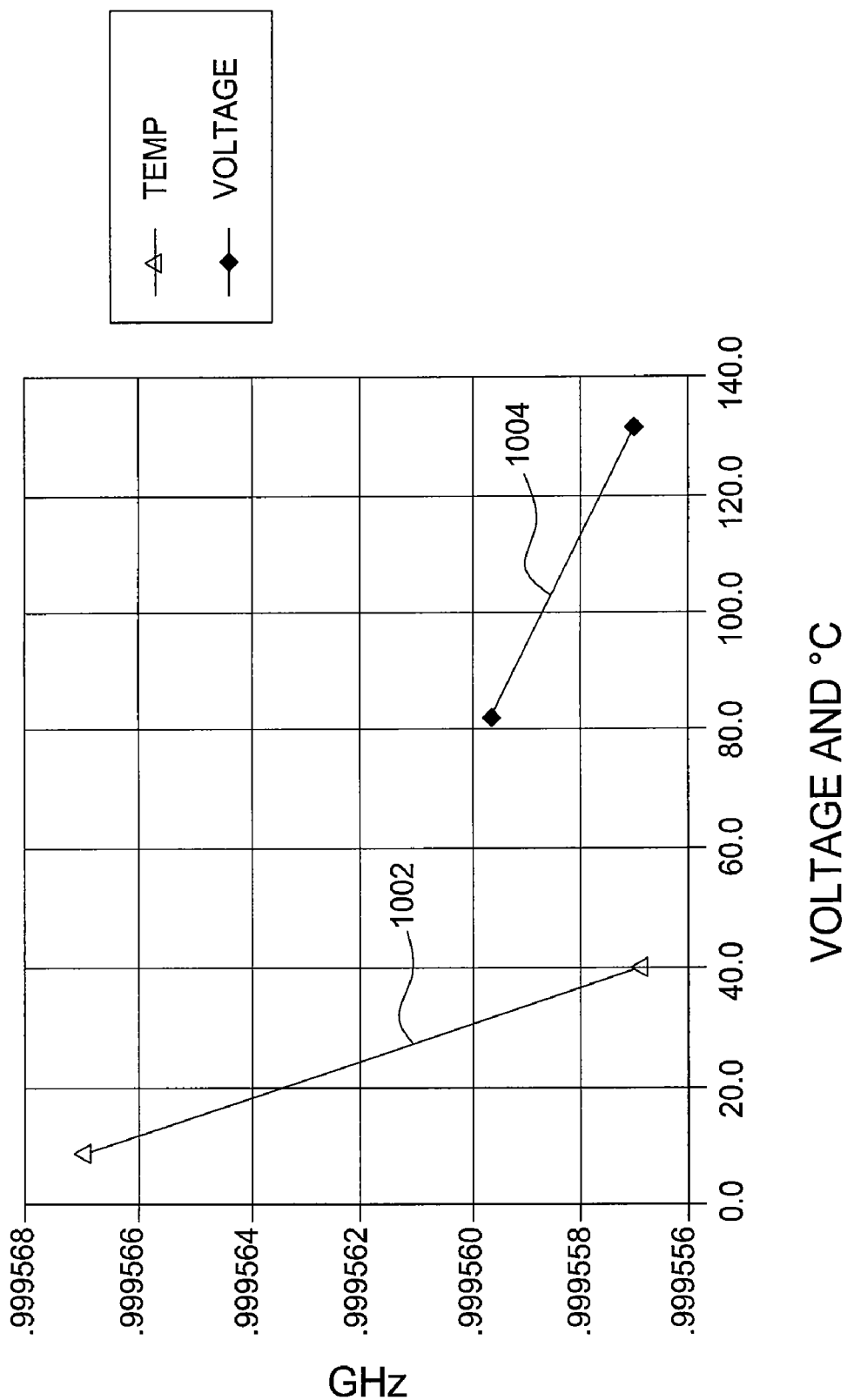

In summary the 14 MHz crystal will change by 1 ppm for each degree C. change in temperature. This will result in a change of 1 ppm per degree C. in the GHZ CLOCK. FIG. 10 shows actual results measured on a qsol machine. They show a 35 degree C. change 1002 in external temperature caused a 10 ppm change in crystal frequency. This indicates that the crystal is somewhat insulated from external temperature changes. Also indicated in these results is that variations in the 120 VAC supply do not significantly affect the crystal frequency 1004.

Rfc-1305 states "The 32-bit Skew-Compensation register is used to trim the oscillator frequency by adding small phase increments at periodic adjustment intervals and can compensate for frequency errors as much as 0.01% or 100 ppm."

Media Server Rate Controller

The Media Server utilizes the on-chip Time Stamp Counter (which has nS precision) to transmit the frames of MPEG data at the appropriate time. Given a precise knowledge of the frequency of the TSC, the correct period between frames (Ticks per Frame) can be deduced as follows:

Frames_Per Second=MPEG_Bit_Rate/Bytes_Per_Packet/Packets_Per_Frame/Bits_Per_Byte Ticks_Per_Frame=Ticks_Per_Second/Frames_Per_Second In order to measure Ticks_Per_Second, it is necessary to count the ticks of the TSC over an accurately measured period of time.

Figure 11:
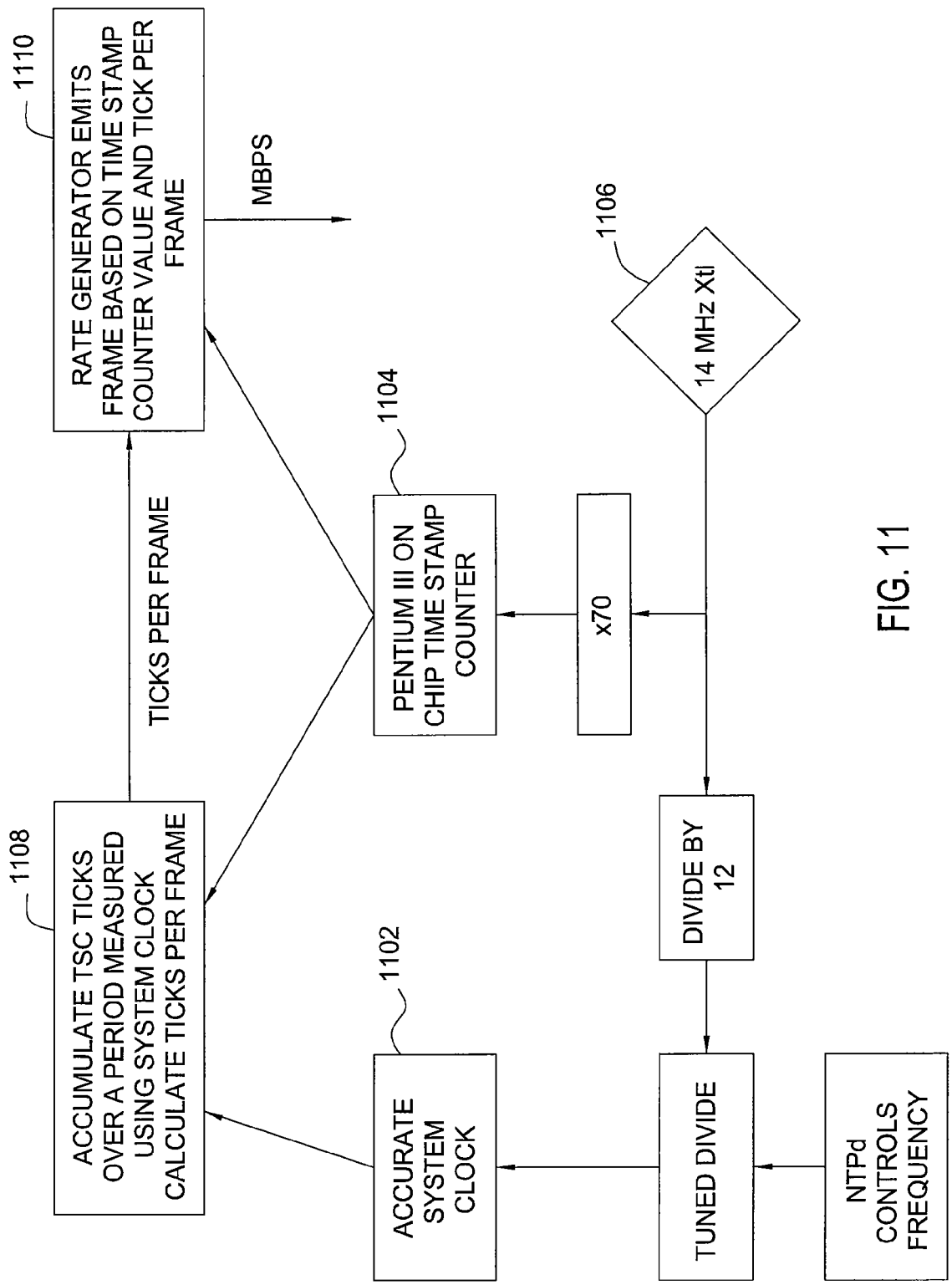
FIG. 11 depicts an exemplary rate control loop suitable for use in an embodiment of the present invention.

In FIG. 11 you can see the point at which NTP corrects the system clock 1102. These corrections do not affect the Pentium's Time Stamp Counter 1104 (TSC) which is directly driven from the crystal 1106, consequently, the Media Server Rate Controller 1108 will continuously measure the TSC frequency and correct the value of Ticks per Second used to correctly space the transmitted frames.

The Media Server 1108 attaches an expected transmission time to each frame that is queued up and ready to transmit. The difference between consecutive frames is the value Ticks_Per_Frame. The Media Server's rate generator 1110 monitors the TSC 1104 and tries to transmit the packets at the correct time.

Initial System Calibration

Since it is important to have an accurate measurement of the TSC frequency before the server can deliver conformant streams, in one embodiment the TSC 1104 be calibrated during the factory testing. The initial calibration would be over a one-hour period. It would be essential to ensure that a suitable timeserver be available during this initial calibration. This optionally consists of a T1 connection to the Public Internet timeservers. The calibration value is held on the disk in the writable partition.

Boot Time

During boot up, the Media Server reads the last calculated value for the TSC frequency. During the next hour, the server calculates a new value; this may vary from the current value due to NTP errors and temperature variations etc. The maximum temperature change possible in a head end is 30 degrees C. This causes a 10-ppm change in frequency. In one embodiment, the maximum NTP error tolerated in crystal frequency measurement is 10 ppm. If the new value differs by more 3 than 25 ppm, this value is capped at 25 ppm and a new value calculated. Should 3 successive values be capped, a warning is generated.

Normal Operation

During normal operation, the temperature will be stable relative to the one-hour measurement period. Again, if the new value differs by more than 25 ppm, this value is capped and a new value calculated. Should 3 successive values be capped, a warning is generated. Rather than just accepting the new value, it is important to smooth out the affect of NTP error in the time measurements.

The new value is used to update the current value using a low pass filter:

$$NEXT\_HZ=OLD\_HZ+k*(NEXT\_HZ-OLD\_HZ)$$

Figure 12:
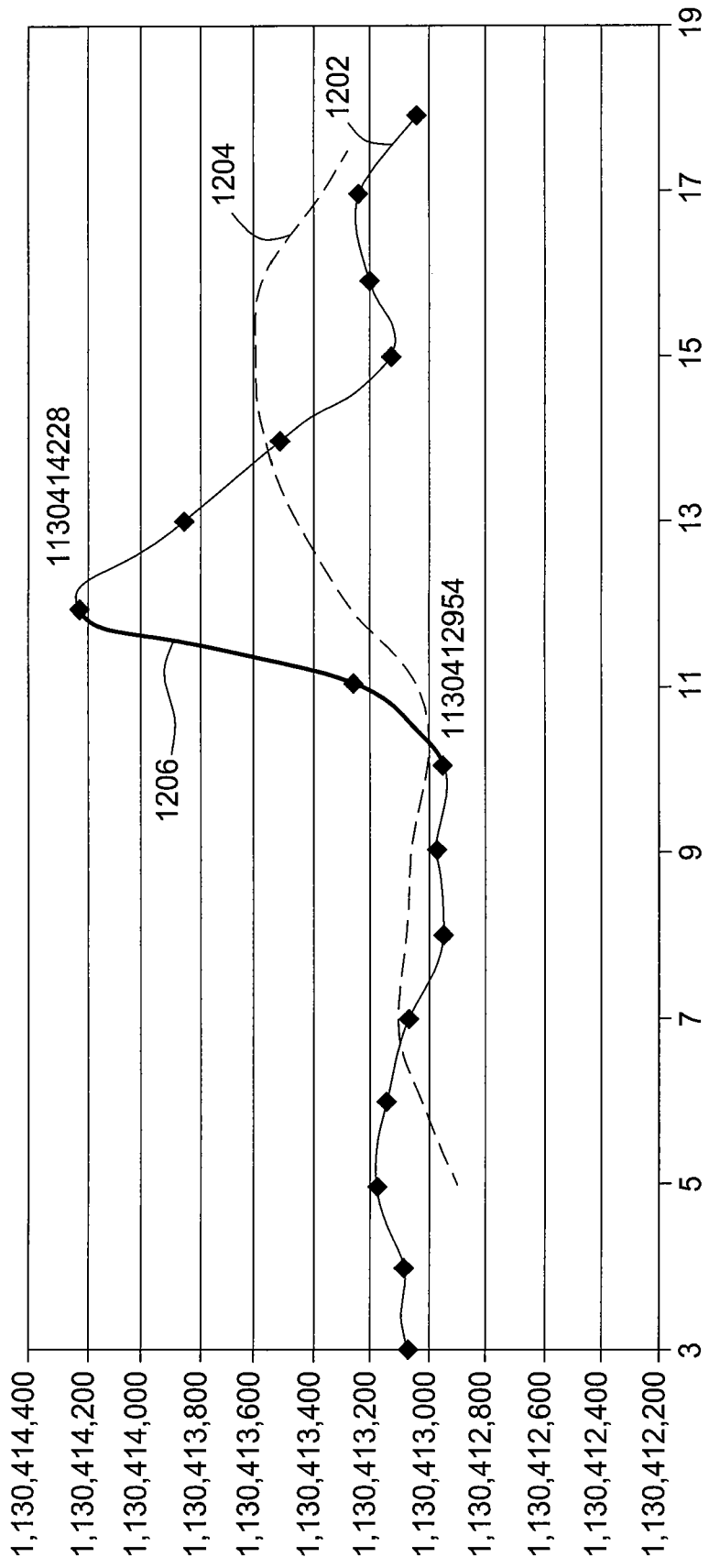

The desired value of k in the equation can be estimated from the typical sample data in FIG. 12.

The solid line 1202 is the actual crystal frequencies measured at 3600-second intervals. The dotted line 1204 is a moving average. The change 1206 between points 1,130,412,954 and 1,130,412,954 is 1274 or 1.274 ppm. The actual amount we would like to change is indicated by the change in the moving average line at this point. The value of k should be 0.25. This value should be confirmed by experimentation.

The old value must be stored in a non-volatile memory such that it can be ready after a re-boot of the system. It is proposed that a region of disk be reserved for such storage.

Appendix A

| VBV Drain Calculation | |
|---|---|
| VBV size (bits) | 1835008 |
| Effective buffer size | 90% |
| Buffer Headroom | 10% |

| Video rate (Mbps) | | 3.0 | | 3.18 | | 4 | | 15 | |
|---|---|---|---|---|---|---|---|---|---|
| What output rate drains the buffer in: | Δ bps | Mbps | error (ppm) | Mbps | error (ppm) | Mbps | error (ppm) | Mbps | error (ppm) |
| 1 hour | 458.75 | 2.99954 | 152.92 | 3.17954 | 144.26 | 3.99954 | 114.69 | 14.99954 | 30.58 |
| 2 hours | 229.38 | 2.99977 | 76.46 | 3.17977 | 72.13 | 3.99977 | 57.34 | 14.99977 | 15.29 |

| What output rate overflows the buffer in: | Δ bps | Mbps | error (ppm) | Mbps | error (ppm) | Mbps | error (ppm) | Mbps | error (ppm) |
|---|---|---|---|---|---|---|---|---|---|
| 1 hour | 50.97 | 3.00005 | 16.99 | 3.18005 | 16.03 | 4.00005 | 12.74 | 15.00005 | 3.40 |
| 1.5 hours | 33.98 | 3.00003 | 11.33 | 3.18003 | 10.69 | 4.00003 | 8.50 | 15.00003 | 2.27 |
| 2 hours | 25.49 | 3.00003 | 8.50 | 3.18003 | 8.01 | 4.00003 | 6.37 | 15.00003 | 1.70 |

Typical PC Clock Crystal

| Frequency | 32.768 kHz |
|---|---|
| Freq tolerance @ 25° C. | +/− 20 ppm |
| Aging 1st yr @ 25° C. | +/− 3 ppm |
| Freq stability | −0.04 ppm/(Delta ° C.)2 |
| Temp operating range | −10 to +60° C. |

Typical PC Ref Clock Chip

| Frequency | 14.31818 MHz |
|---|---|
| Freq tolerance @ 25° C. | TBD |
| Aging 1st yr @ 25° C. | TBD |
| Freq stability | TBD |
| Temp operating range | TBD |

The error with the NTP corrected system clock typically is less than 5 ms. Assuming this, we will have no more than 10 ms of error when measuring a duration of time (two measurements). If we measure the GHz clock over one hour we will have up to 10 ms of error in 3600 seconds or 2.7 ppm error. The output of the server is directly driven by the GHz clock and will be 2.7 ppm.

Figure 14:
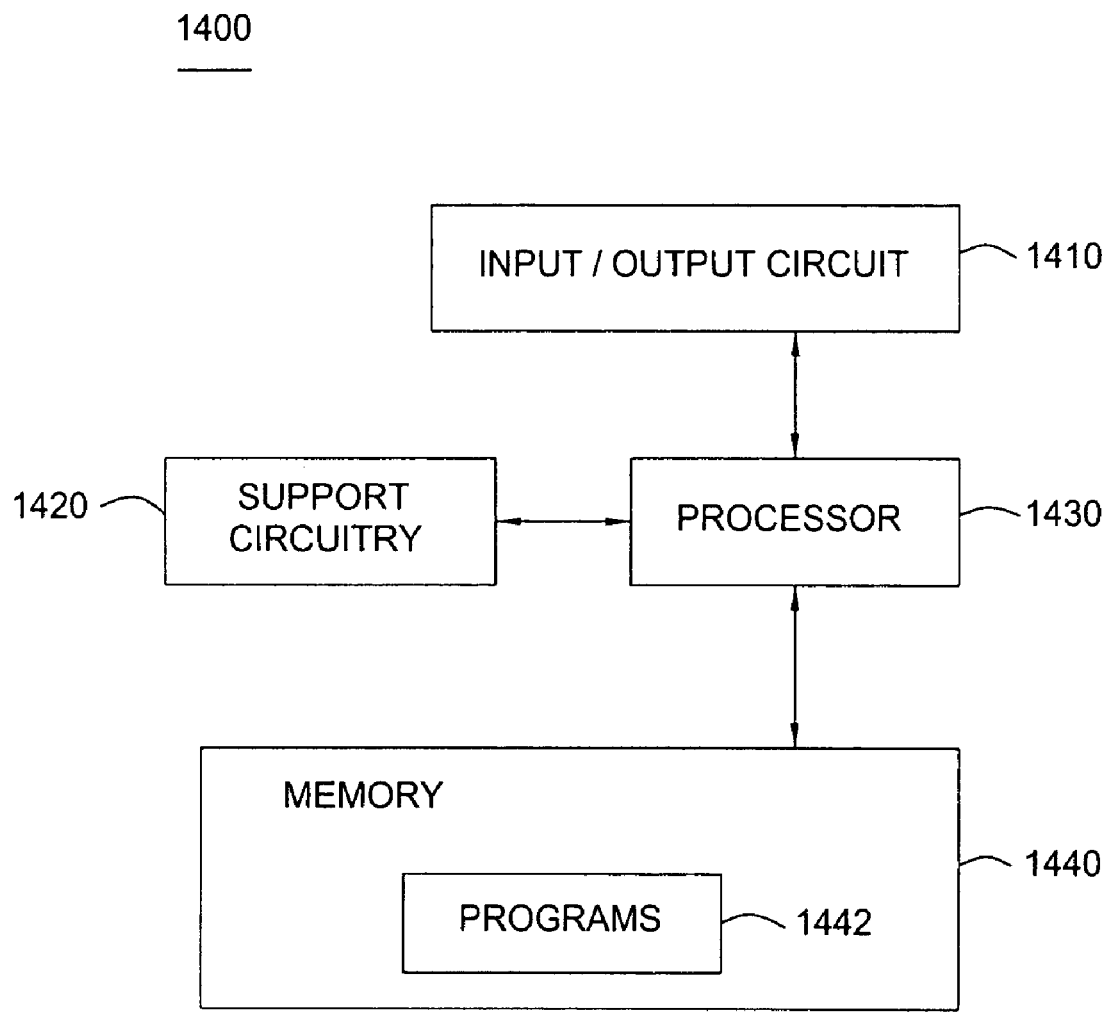
FIG. 14 depicts a controller suitable for use with the present invention.

FIG. 14 depicts a high-level block diagram of a controller suitable for use with the present invention. Specifically, the controller 1400 of FIG. 14 may be employed to implement the various software functions and/or method steps described herein, as well as control server and transmission hardware and generally implement the architectures discussed below with respect to FIGS. 1, 2 and 11. The controller 1400 of FIG. 14 comprises a processor 1430 as well as memory 1440 for storing various control programs and other programs 1442. The processor 1430 cooperates with conventional support circuitry 1420 such as power supplies, clock circuits, cache memory and the like as well as circuits that assist in executing the software routine stored in the memory 1440. As such, it is contemplated that some of the steps discussed herein as software processes may be implemented within hardware, for example as circuitry that cooperates with the processor 1430 to perform various steps. The controller 1400 also contains input/output (I/O) circuitry 1410 that forms an interface between the various functional elements communicating with the controller 1400. Although the controller 1400 of FIG. 2 is depicted as a generally purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

Figure 13:
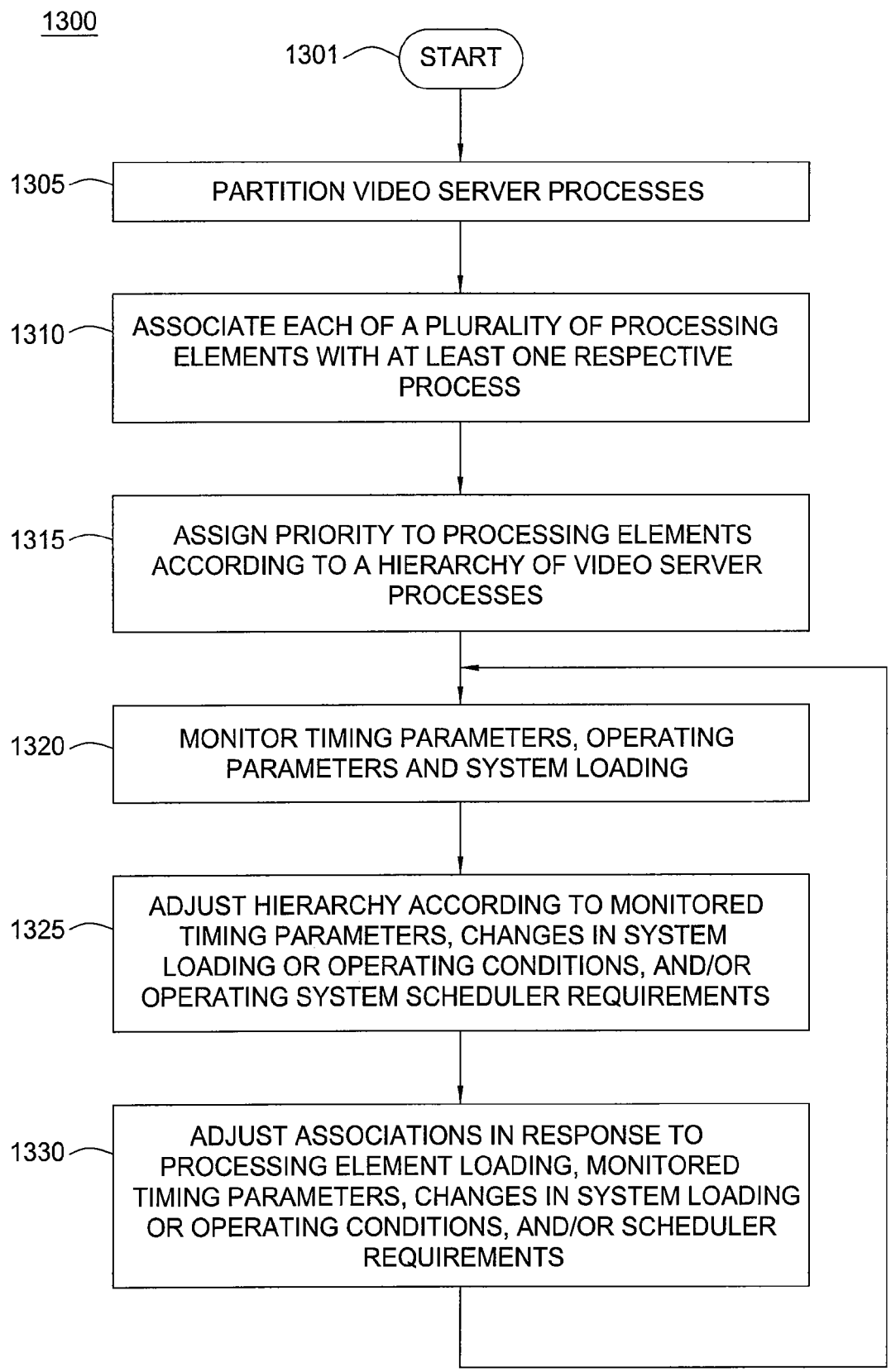
FIG. 13 depicts a high level block diagram providing a plurality of actions in accordance with an embodiment of the present invention.

FIG. 13 depicts a high level block diagram providing a plurality of actions in accordance with an embodiment of the present invention. Specifically, the method 1300 of FIG. 13 is entered at step 1301 and, at step 1305, video server processes are partitioned. That is, at step 1305 a plurality of video server processes are segmented from each other such that individual processes may be executed using respective processing elements. At step 1310, each of a plurality of processing elements is associated with at least one respective process. That is, at step 1310, the video server processes partitioned at step 1305 are distributed across a plurality of processing elements.

At step 1315, priority is assigned to the various processing elements according to a hierarchy of video server processes. That is, at step 1315, the operating system assigns higher priority to those processing elements supporting video server processes that are high on a hierarchy of (or prioritized list of) video server processes. Such higher processes include memory access, stream transport encoding and the like. In general, higher order or higher priority video server processes are those that are directly responsible for insuring that the timing constraints discussed herein are met by the video server.

At step 1320, timing parameters, operating parameters and system loading parameters (and, optionally, other parameters) are monitored.

At step 1325, the hierarchy of video server processes is adjusted according to monitor timing parameters, changes in system loading or operating conditions and/or operating systems scheduler requirements. Thus, at step 1325, the relative priority level of video server processes is adjusted based upon various conditions within the video server and, optionally, its related transport network.

At step 1330, adjustments are made to the associations between video server processes and processing elements in response to processing element loading, monitored timing parameters, changes in system loading or operating conditions and/or operating system scheduler requirements. Thus, at step 1330, one or more of the plurality of processing elements may have an additional video server process associated with it or a video server process disassociated (i.e., removed).

The above-described method may be implemented using the systems and apparatus described below. Additional means of implementing the above method will be appreciated by those skilled in the art and informed by the teachings of the present invention.

The method 1300 of FIG. 13 is depicted as proceeding from step 1330 to step 1320 (i.e., repeating steps 1320-1330). It is noted that the hierarchy adjustments of step 1325 may result in changes of assigned priority to processing elements such as described above with respect to step 1315, and that association adjustments of step 1330 may result in association changes such as described above with respect to step 1310. Moreover, it is noted that in various embodiments of the invention either one of steps 1325 and 1330 are not utilized in the method 1300 of FIG. 13.

Advantageously, the invention enables the use of mass produced PC computing systems within the context of high accuracy streaming media applications.

While the foregoing is directed to embodiments of the present invention, other and further embodiments of the invention may be devised without departing from the basic scope thereof, and the scope thereof is determined by the claims that follow.

The invention claimed is:

1. A method, comprising:
associating each of a plurality of processing elements with at least one respective video server process;
assigning priority to said processing elements according to a hierarchy of video server processes, each of said video server processes having a relative priority level with respect to other video server processes; and
adjusting said hierarchy of video server processes according to at least one of monitored timing parameters, changes in system loading conditions, changes in operating conditions and operating system scheduler requirements;
wherein said step of associating each of a plurality of processing elements comprises binding individual processing elements to respective processes, and said binding is provided by modifying a kernel within an operating system.

2. The method of claim 1, further comprising:
adjusting said associations of processing elements and video server processes in response to at least one of processing element loading, monitored timing parameters, changes in system loading conditions, changes in system operating conditions and operating system scheduler requirements.

3. The method of claim 1, wherein a first processing element is associated with at least one administrative process and a second processing element is associated with software for driving video output data at a controlled rate.

4. The method of claim 1, wherein said individual processing elements are distributed among a plurality of servers.

5. The method of claim 4, further comprising synchronizing said plurality of servers using a network time protocol (NTP).

6. A method, comprising:
associating each of a plurality of processing elements with at least one respective video server process;
assigning priority to said processing elements according to a hierarchy of video server processes, each of said video server processes having a relative priority level with respect to other video server processes; and
adjusting said hierarchy of video server processes according to at least one of monitored timing parameters, changes in system loading conditions, changes in operating conditions and operating system scheduler requirements;
wherein said step of associating each of a plurality of processing elements comprises binding individual processing elements to respective processes; and a first processing element is associated with at least one administrative process and a second processing element is associated with software for driving video output data at a controlled rate.

7. The method of claim 6, further comprising:
adjusting said associations of processing elements and video server processes in response to at least one of processing element loading, monitored timing parameters, changes in system loading conditions, changes in system operating conditions and operating system scheduler requirements.

8. The method of claim 6, wherein said individual processing elements are distributed among a plurality of servers.

9. The method of claim 8, further comprising synchronizing said plurality of servers using a network time protocol (NTP).

10. A controller, comprising:
a processor; and
a memory for storing a program, which, when executed by the processor, performs a method comprising:
associating each of a plurality of processing elements with at least one respective video server process;
assigning priority to said processing elements according to a hierarchy of video server processes, each of said video server processes having a relative priority level with respect to other video server processes; and
adjusting said hierarchy of video server processes according to at least one of monitored timing parameters, changes in system loading conditions, changes in operating conditions and operating system scheduler requirements;
wherein said step of associating each of a plurality of processing elements comprises binding individual processing elements to respective processes, and said binding is provided by modifying a kernel within an operating system.

11. A controller, comprising:
a processor; and
a memory for storing a program, which, when executed by the processor, performs a method comprising:
associating each of a plurality of processing elements with at least one respective video server process;
assigning priority to said processing elements according to a hierarchy of video server processes, each of said video server processes having a relative priority level with respect to other video server processes; and
adjusting said hierarchy of video server processes according to at least one of monitored timing parameters, changes in system loading conditions, changes in operating conditions and operating system scheduler requirements;
wherein said step of associating each of a plurality of processing elements comprises binding individual processing elements to respective processes; and a first processing element is associated with at least one administrative process and a second processing element is associated with software for driving video output data at a controlled rate.

* * * * *